April 27, 1943.        R. LEPPLA        2,317,390
CAR TRUCK
Filed March 12, 1941        3 Sheets-Sheet 2

INVENTOR
*Rudolph Leppla*
BY *Evans + McCoy*
ATTORNEYS

April 27, 1943.　　　　　R. LEPPLA　　　　　2,317,390
CAR TRUCK
Filed March 12, 1941　　　　　3 Sheets-Sheet 3

INVENTOR
Rudolph Leppla
BY Evans + McCoy
ATTORNEYS

Patented Apr. 27, 1943

2,317,390

UNITED STATES PATENT OFFICE 2,317,390

CAR TRUCK

Rudolph Leppla, Davenport, Iowa, assignor, by mesne assignments, to McConway & Torley Corporation, Pittsburgh, Pa., a corporation of Pennsylvania Application March 12, 1941, Serial No. 382,955

24 Claims. (Cl. 105—190)

This invention relates to car trucks of the so-called swing motion type, in which the bolster is supported upon springs carried by supporting members pivotally suspended from a transom extending across the space between the truck side frames, and particularly to trucks for freight cars designed to carry heavy loads.

In trucks for railway cars it is desirable to so support the car body that oscillations or vibrations in the car body are reduced as much as possible. In freight cars, where there may be great variations in the weight of the load imposed upon the trucks, considerable difficulty has been experienced in providing a spring cushion which provides easy riding for all conditions of loading. The spring supports for such cars have been designed to provide adequate cushioning under maximum load. Springs stiff enough to provide an effective cushion for the maximum load are not as effective as desirable in reducing the vibrations in an empty or a lightly loaded car.

An important object of the present invention is to provide a car truck having two spring cushions, one of which serves as the main cushion when the car is empty or lightly loaded, and the other of which serves as the main cushion when the car is heavily loaded, thereby providing a truck which effectively cushions the car body under all conditions of loading.

A further object of the invention is to provide a truck having an auxiliary spring cushion which serves to effectively reduce the transmission of vibrations to an empty or lightly loaded car body, and which when the car is heavily loaded serves as a cushion for the truck frame to reduce the hammering action of rail joints or eccentric wheels on the load supporting members of the truck.

A further object of the invention is to provide a car truck of the cushioned transom type which is so constructed that the side frames and the wheels of the truck may be removed without disturbing the bolster and transom assembly or the transom-supporting springs.

A further object of the invention is to provide a truck of the cushioned transom type in which the transom is guided for vertical movements in the side frames by means of inner stops or guides and lower guides which are widely spaced so that they hold the side frames against lateral tilting with respect to the transom, with little frictional resistance to vertical movements of the transom and side frame.

A further object of the invention is to provide a truck in which the side frames and interconnecting member cooperate to prevent the truck from running out of square to any substantial degree.

A further object of the invention is to provide a heavy duty freight car truck in which wide seats for the transom are provided on the side frames between the transom cushioning springs, and in which the loads in excess of those carried by the transom springs are distributed over a considerable portion of the length of the side frames.

With the above and other objects in view, the invention may be said to comprise the car truck as illustrated in the accompanying drawings hereinafter described and particularly set forth in the appended claims, together with such variations and modifications thereof as will be apparent to those skilled in the art to which the invention appertains.

Reference should be had to the accompanying drawings forming a part of this specification, in which:

Fig. 4 is a section taken on the line indicated at 4—4 in Fig. 1;

Fig. 5 is a sectional view showing an elliptic bolster cushioning spring;

Figure 1:
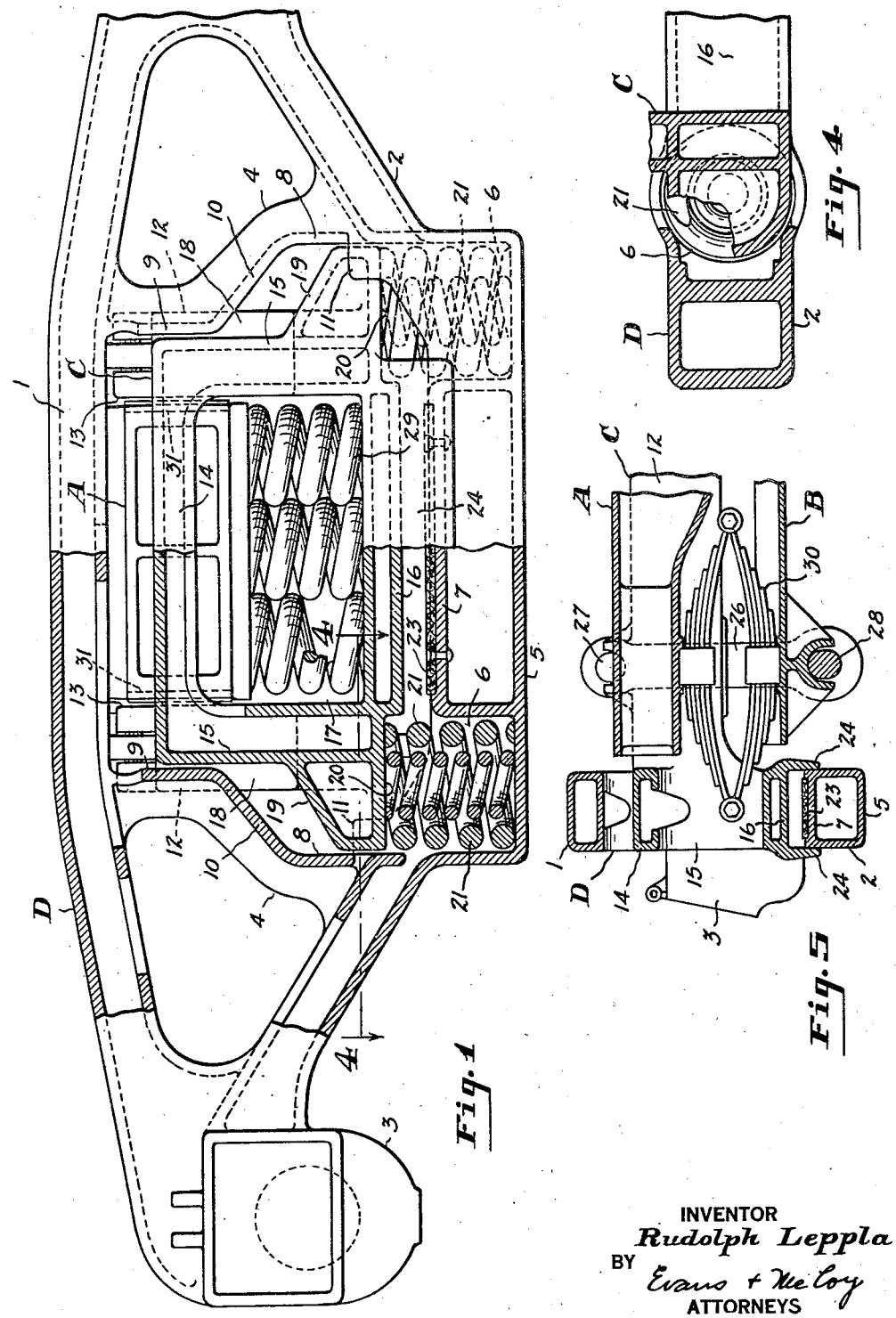
Figure 1 is a fragmentary side elevation of a truck embodying the invention, partly broken away to show portions of the side frame and transom in vertical section.
Figure 2:
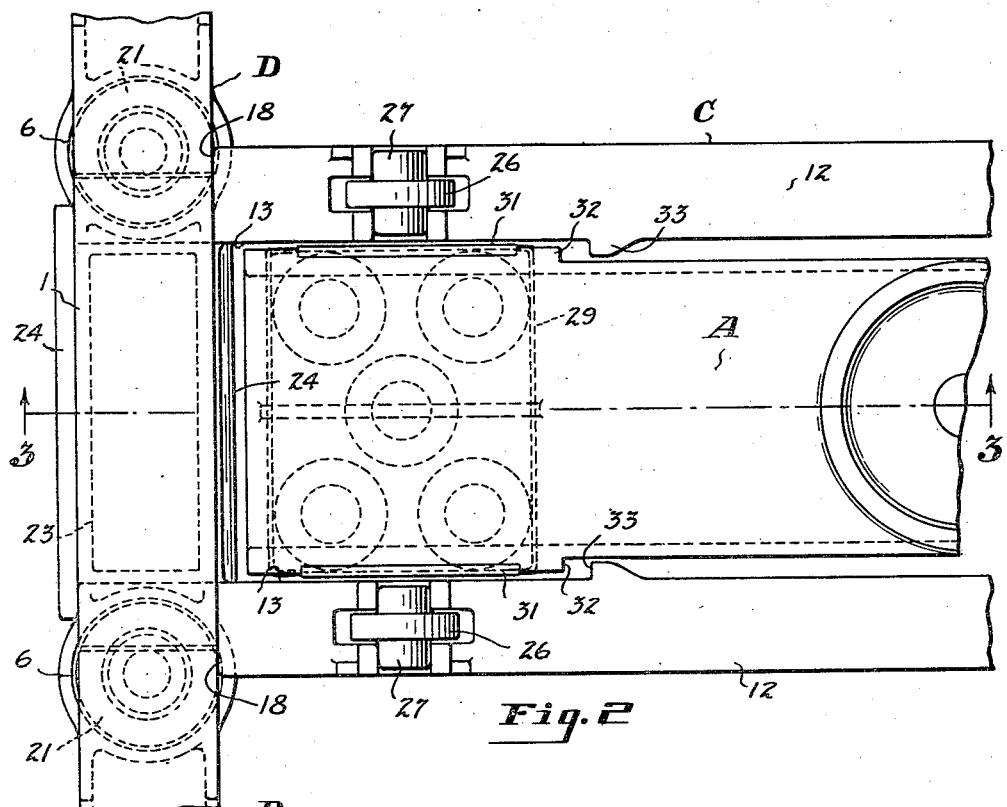
Fig. 2 is a fragmentary top plan view of the truck.
Figure 3:
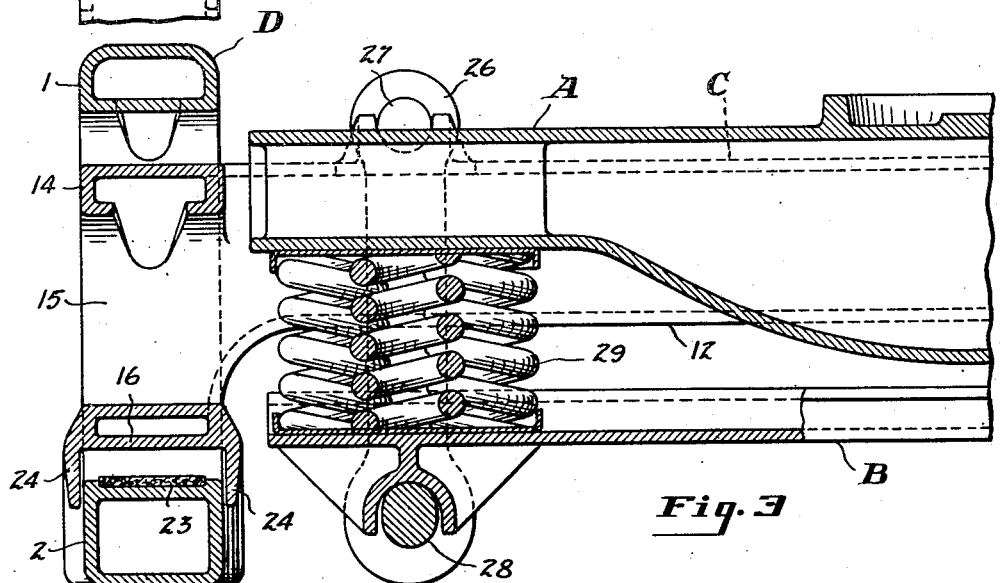
Fig. 3 is a section taken on the line indicated at 3—3 in Fig. 2.

In view of the fact that the side frames of the truck and the supports for the opposite ends of the transom, spring plank and bolster are identical, the accompanying drawings show the construction at one side of the truck only, it being understood that the construction shown is duplicated at the opposite side of the truck, as is the usual practice in car truck construction.

Referring to the accompanying drawings, the truck of the present invention has a bolster A upon which the car body is supported, a spring plank B, which carries supporting springs upon which the ends of the bolster A rest, a transom C from which the spring plank is pivotally suspended, and side frames D in which the ends of the transom C are slidably mounted.

Each side frame D has an upper compression chord 1 and a lower tension chord 2, which connect journal boxes 3 located at opposite ends of the frame, the chords 1 and 2 being connected intermediate their ends by spaced guide columns 4. A central opening is provided in the side frame between the guide columns 4 and the upper and lower chords 1 and 2. The bottom chord 2 has a relatively long horizontal portion 5 beneath the central opening, which is provided at its ends with spring pockets 6 which are located closely adjacent the lower ends of the columns 4. Between the spring pockets 6, the horizontal portion 5 of the bottom chord has a wide seating portion 7, upon which the transom C may rest. Each of the columns 4 has a lower vertical guide portion 8 which is closely adjacent the adjacent spring pocket 6 and an inwardly offset vertical guide portion 9 at its upper end which is connected to the top chord 1 of the side frame. Between the vertical guide portions 8 and 9, the columns 4 have upwardly converging, inclined portions 10, which overlie the spring pockets 6. The side frames are provided with guide flanges 11 which project into the central transom-receiving opening at the inner and outer sides of the vertical guide portions 8 of the columns 4. The flanges 11 terminate short of the upper ends of the vertical guide portions 8 to permit removal of the side frames from the transom C, as will be hereinafter more fully explained.

The transom C has two crossbeams 12 which extend across the space between the side frames D, and which are spaced apart to receive the bolster A between them. The bolster A has end portions guided for vertical movement between the crossbeams 12, the crossbeams having vertical inner faces 13 which serve as guides for the bolster. The crossbeams 12 are rigidly connected at their ends by end members 14, which are the upper cross bars of rectangular transom guide frames positioned in the side frame openings. Each transom guide frame has vertical side bars 15 and a base member 16 connecting the lower ends of the side bars.

The transom, with its end frames, may be in the form of a one-piece casting. The top bar 14, side bars 15 and base member 16 of the transom guide frame provide a substantially rectangular window 17 in the transom end frame through which access may be had to the bolster-supporting springs, and which when an elliptic spring is used, such as shown in Fig. 5, provides an opening to receive an end of the spring. Crossbeams 12 are provided with shoulders 18, which overlie the inner sides of the vertical guide portions 9 of the guide columns 4 of the side frames.

The side bars 15 of the transom guide frame have lateral projections 19 adjacent their lower ends, which provide an extended base portion for the transom which is guided between the lower vertical portions 8 of the guide columns. The projections 19 are received between the guide flanges 11 of the side frame and are provided on their under sides with seats 20, which rest upon the upper ends of supporting springs 21 mounted in each of the spring pockets 6.

The depth of spring pockets 6 and the free height of the springs 21 is so proportioned that the projections 19 of the transom will move down into the spaces between the guide flanges 11 when the transom is placed in position. Sufficient clearance is provided between the projections 19 and inclined portions 10 of the guide columns to permit the transom to be lifted to a position in which the projections 19 are clear of the flanges 11 to permit easy placement or removal of the side frame. The yieldability (i. e., deflection per unit load) of the springs 21 is such that when a predetermined load is imposed upon the transom C, the base portion 16 of the transom and frame will rest upon the seat 7 of the bottom chord of the side frame. By proper choice of springs the seating of the transom on the side frame can be made to occur under any desired load, but in any case, seating will occur before the crushing point or safe stress limit of the springs has been reached.

Preferably a cushion is provided between the base member 16 and the seat 7. As herein shown, the pad 23, which may be composed of rubber and fabric, is attached to the seat 7 to receive the impact of the base member 16. The base member 16 is provided with depending flanges 24, which overlie the inner and outer sides of the bottom chord 2 of the side frame, and these flanges, together with the upper guide shoulders 18 and the guide flanges 11, serve to hold the side frame against tilting movements with respect to the transom. The height of the flanges 24 is such that when the transom is lifted to the position clear of the flanges 11, flanges 24 will also be clear of the bottom chord 2, so that the side frame can be removed laterally.

To prevent the truck from getting out of square, there must be close cooperation between the side frames and the member which connects them. In the present form of my invention, flanges 24 depending from the transom end, together with the wing portions 19 cooperate with the side frames to prevent angular movement between transom and side frames in a horizontal plane. Because the projections 19 are so widely spaced, considerable clearance can be allowed between these projections and the guide flanges 11 to permit free vertical movement of the transom without permitting horizontal angling to any substantial degree.

The guide flanges 24 at the bottom of the transom guide members are spaced a considerable distance below the guide shoulders 18 which engage the upper portions of the side frames, so that a minimum of tilting movement is permitted and an effective leverage is provided to resist the laterally exerted forces tending to tilt the frames, without creation of excessive pressure and sliding friction.

The spring plank B is suspended from the transom C by means of links 26, which are connected at their upper ends to the crossbeams 12 by pivots 27, and at their lower ends to the spring plank B by pivots 28. Suitable cushioning springs are carried by the spring plank B upon which the ends of the bolster A are supported. The spring support for the bolster may be in the form of a nest of compression coil springs 29, as shown in Figs. 1 to 4, or may be in the form of an elliptic spring 30, as shown in Fig. 5, or any other combination desired.

To reduce the wear on the ends of the bolster, due to sliding engagement with the crossbeams 12, the ends of the bolster may be provided with hardened steel wear plates 31 for engagement with the guide faces 13 of the crossbeams. End portions of the bolster to which the wear plates 31 are attached are somewhat wider than the central portion of the bolster, and as shown shoulders 32 are provided at the inner ends of the guide portions. Lugs 33 on the inner sides of the crossbeams 12 project into the path of the shoulders 32 and provide stops to limit the extent of endwise movement of the bolster with respect to the transom.

While my invention pertains to a truck construction which will allow practically any desired arrangement of springs, it is expected that the arrangement most used will be that in which the transom springs are more yieldable than the bolster springs but yet of sufficient stiffness to allow for some deflection beyond that resulting from static full load. Under these conditions the transom cushioning springs 21 do most of the cushioning and the relatively stiffer bolster supporting springs have a snubbing effect when the transom seats on the side frame because of excessive impacts. Vibrations are damped by reason of the differences in the periods and amplitude of the vibration of the two sets of cushioning springs.

When the load upon the truck is not sufficient to compress the springs 21 into the pockets 6 and seat the transom on the side frames, the total deflection of the car body is the sum of the compression of the springs 21 under the given load and the compression of the springs 29 or 30 under the same load. The two sets of springs thus provide a car body support which permits the bolster and car body to have a greater range of movement, and provide a more yieldable cushion than would be provided by either set of springs alone.

It is to be understood that the transom springs may be of any desired height with respect to the seat 7 and that deflection of these springs may be limited at any point desired. It is also to be understood that all the springs in the truck should be protected against overload.

The bolster and transom cushioning springs can be readily removed and replaced with other springs of different capacity. For example, if it is desired to employ a car for carrying loads lighter than those for which the trucks were originally designed, the transom springs, or both the transom and bolster springs may be replaced with springs having the capacity and amplitude of movement suitable for the lighter load.

By providing side frame openings which have a height sufficient to permit the transom to be lifted off the springs 21 and to position the flanges 24 above the seat 7, and the projection 19 above the flanges 11, the side frames are easily removable. To remove a side frame it is necessary only to jack up the transom and support it in its uppermost position, in which position the side frame can be readily removed. This may be done with the car body in place upon the bolster. By providing a wide transom-receiving opening in the side frames and positioning the transom-supporting springs at the ends of this opening, a wide seat is provided for the transom, and the load in excess of that carried by the transom springs is advantageously distributed throughout a considerable portion of the length of the side frames, so that the side frames may be of lighter construction than would otherwise be required for a truck of the same capacity.

Figure 6:
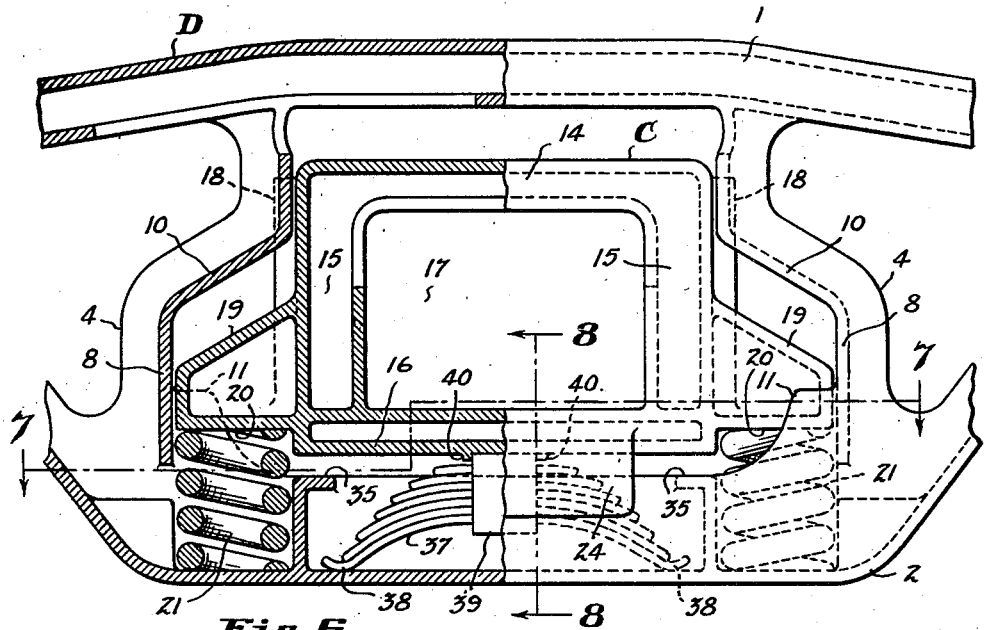
Fig. 6 is a fragmentary side elevation showing a modified arrangement of transom cushioning springs.
Figure 7:
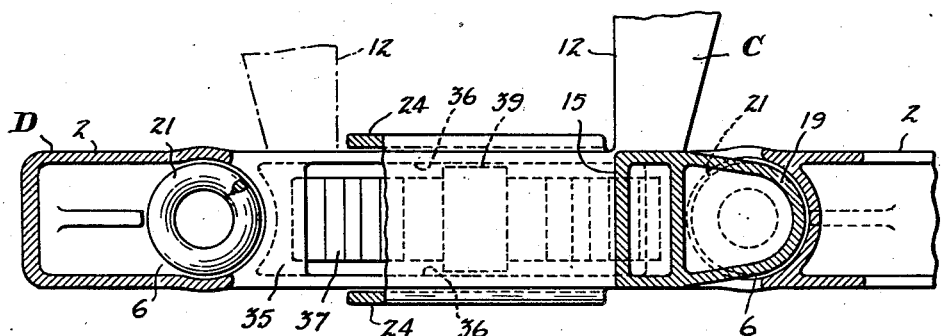
Fig. 7 is a section taken on the line indicated at 7—7 in Fig. 6.
Figure 8:
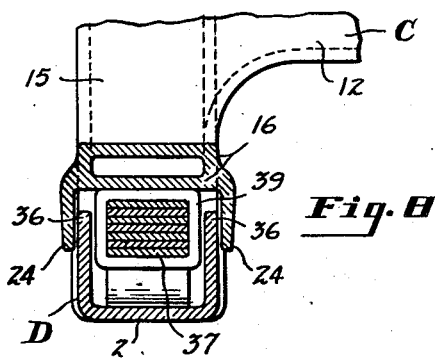
Fig. 8 is a section taken on the line indicated at 8—8 in Fig. 6.

In Figs. 6, 7, and 8 of the drawings, there is shown a truck which is of the same construction as the truck shown in Figs. 1 to 5, except that a modified form of spring cushion for the transom is provided. In this modification the base 16 of the transom guide frame is engageable with seats 35 adjacent the spring pockets 6 and with the upper edges of the side walls 36 of the chord 2, the chord 2 being open at the top between the seats 35 to provide a central spring pocket which accommodates a semi-elliptic leaf spring 37, which has end portions 38 slidably engaging the bottom wall of the chord 2. The spring 37 has a central band 39 of rectangular form which slidably fits between the side walls 36 and which engages the base member 16 of the transom guide frame, which is provided with projecting lugs 40 which engage opposite ends of the band 39 to maintain the spring 37 in a central position. The spring 37 normally projects above the seats 35 and provides an additional spring support for the transom between the springs 21. The spring 37 may be designed to take an increasing portion of the load as the transom moves downwardly so as to considerably lessen the yieldability of the cushion as the bar member 16 approaches the seats 35, and thereby lessen the impact of the base member 16 upon the seats 35.

It is to be understood that variations and modifications of the specific device, as herein shown and described for the purpose of illustration, may be made without departing from the spirit of the invention.

What I claim is:

1. In a car truck, side frames having top and bottom chords and spaced columns connecting said chords to provide a central opening, said columns having lower end portions providing opposed vertical guide faces, upper end portions providing opposed vertical guide faces offset inwardly with respect to the lower end portions and upwardly converging central portions connecting said upper and lower portions, and a transom having end guide portions slidably mounted in said central openings, the guide portions of the transom having upper portions guided by the upper portions of said columns, said transom having lateral extensions engageable with the offset lower end portions of the columns and having guide portions engageable with the inner sides of the top portions of the columns and other guide portions engageable with the outer faces of the bottom chords to hold the side frames against tilting movements with respect to said transom.

2. In a car truck, side frames having top and bottom chords and spaced columns connecting said chords to provide a central opening, said columns having lower end portions providing opposed vertical guide faces, upper end portions providing opposed vertical guide faces offset inwardly with respect to the lower end portions and upwardly converging central portions connecting said upper and lower portions, the lower end portions of said columns having inwardly extending guide flanges at the inner and outer sides of their vertical guide faces, said flanges terminating below said converging central portions of the columns, and a transom having guide portions slidably mounted in said central openings, the guide portions of the transom having upper portions received between vertical faces of the upper portions of said columns and being provided with guide portions engageable with the inner sides of the upper portions of the columns, said guide portions of the transom having lateral extensions at their lower ends which are received between the guide flanges at the lower ends of the columns, said extensions being of a height less than the space between the upper ends of the guide flanges and the upper ends of the lower vertical guide faces of the columns, whereby the transom may be lifted to a position permitting removal of the side frames.

3. In a car truck, a side frame having top and bottom chords and spaced guide columns connecting said chords, said columns having laterally offset, vertical guide portions at their upper and lower ends and upwardly converging central portions, said bottom chord having spring pockets underlying the converging portions of the columns and a horizontally disposed seat between said spring pockets, a transom having an end portion mounted for vertical movement between the guide columns, said end portion having a horizontally disposed base portion overlying said seat and spring pockets and a narrower upper portion guided between the upper vertical end portions of the columns, and cushioning springs mounted in said pockets and yieldably supporting the transom.

4. In a car truck, a side frame having top and bottom chords and spaced guide columns connecting said chords, said columns having laterally offset vertical guide portions at their upper and lower ends and upwardly converging central portions, said bottom chord having spring pockets underlying the converging portions of the columns and a horizontally disposed seat between said spring pockets, a transom having an end portion mounted for vertical movement between the guide columns, said end portion having a horizontally disposed base portion overlying said seat and spring pockets and a narrower upper portion guided between the upper vertical end portions of the columns, a bolster yieldably supported upon said transom, and cushioning springs mounted in said pockets and yieldably supporting the transom, said springs being compressible into said pockets to permit the transom to rest upon said seat upon the imposition of a predetermined load upon said springs.

5. In a car truck, a side frame having top and bottom chords and spaced guide columns connecting said chords, said columns having laterally offset vertical guide portions at their upper and lower ends and upwardly converging central portions, said bottom chord having spring pockets underlying the converging portions of the columns and a horizontally disposed seat between said spring pockets, a transom having an end portion mounted for vertical movement between the guide columns, said end portion having a horizontally disposed base portion overlying said seat and spring pockets and a narrower upper portion guided between the upper vertical end portions of the columns, said transom having guide members engageable with the side frame for holding the side frame against tilting movements with respect to the transom, and cushioning springs mounted in said pockets and yieldably supporting the transom.

6. In a car truck, a side frame having top and bottom chords and spaced guide columns connecting said chords, said columns having laterally offset vertical guide portions at their upper and lower ends and upwardly converging central portions, said bottom chord having spring pockets underlying the converging portions of the columns and a horizontally disposed seat between said spring pockets, a transom having an end portion mounted for vertical movement between the guide columns, said end portion having a horizontally disposed base portion overlying said seat and spring pockets and a narrower upper portion guided between the upper vertical end portions of the columns, said transom having shoulders overlying the inner sides of the upper portions of the guide columns and bottom flanges overlying the inner and outer faces of said bottom chord at opposite sides of said seat, said transom being movable vertically in said side frame opening a sufficient distance to position said bottom flanges clear of said seat to permit removal of the side frame, and springs mounted in said pockets and yieldably supporting the transom.

7. In a car truck, a side frame having top and bottom chords and spaced guide columns connecting said chords, said columns having laterally offset vertical guide portions at their upper and lower ends and upwardly converging central portions, said bottom chord having spring pockets underlying the converging portions of the columns and a horizontally disposed seat between said spring pockets, a transom having an end portion mounted for vertical movement between the guide columns, said end portion having a horizontally disposed base portion overlying said seat and spring pockets and a narrower upper portion guided between the upper vertical end portions of the colmns, said transom having shoulders overlying the inner sides of the upper portions of the guide columns and bottom flanges overlying the inner and outer faces of said bottom chord at opposite sides of said seat, said transom being movable vertically in said side frame opening a sufficient distance to position said bottom flanges clear of said seat to permit removal of the side frame, and springs mounted in said pockets and yieldably suppporting the transom, said springs having a range of movement such that the springs are freed from the transom when the transom is lifted to the position permitting removal of the side frame.

8. In a car truck, a side frame having top and bottom chords and spaced guide columns connecting said chords, said columns having laterally offset vertical guide portions at their upper and lower ends and upwardly converging central portions, said bottom chord having spring pockets underlying the converging portions of the columns and a horizontally disposed seat between said spring pockets, a transom having an end portion mounted for vertical movement between the guide columns, said end portion having a horizontally disposed base portion overlying said seat and spring pockets and a narrower upper portion guided between the upper vertical end portions of the columns, said transom having shoulders overlying the inner sides of the upper portions of the guide columns and bottom flanges overlying the inner and outer faces of said bottom chord at opposite sides of said seat, said transom being movable vertically in said side frame opening a sufficient distance to position said bottom flanges clear of said seat to permit removal of the side frame, springs mounted in said pockets and yieldably supporting the transom, said springs having a range of movement such that the springs are freed from the transom when the transom is lifted to the position permitting removal of the side frame, said springs being compressible into said pockets to permit the transom to rest upon said seat upon the imposition of a predetermined load upon the springs, and a bolster yieldably supported by said transom.

9. In a car truck, a side frame having top and bottom chords and spaced guide columns connecting said chords, said columns having laterally offset vertical guide portions at their upper and lower ends and upwardly converging central portions, said bottom chord having spring pockets underlying the converging portions of the columns and a horizontally disposed seat between said spring pockets, a transom having an end portion mounted for vertical movement between the guide columns, said end portion having a horizontally disposed base portion overlying said seat and spring pockets and a narrower upper portion guided between the upper vertical end portions of the columns, said transom having shoulders overlying the inner sides of the upper portions of the guide columns and bottom flanges overlying the inner and outer faces of said bottom chord at opposite sides of said seat, said transom being movable vertically in said side frame opening a sufficient distance to position said bottom flanges clear of said seat to permit removal of the side frame, springs mounted in said pockets and yieldably supporting the transom, said springs having a range of movement such that the springs are freed from the transom when the transom is lifted to the position permitting removal of the side frame, said springs being compressible into said pockets to permit the transom to rest upon said seat upon the imposition of a predetermined load upon the springs, a spring plank pivotally suspended from the transom, springs carried by the spring plank, and a bolster supported upon the latter springs.

10. In a car truck, a side frame having top and bottom chords and spaced guide columns connecting said chords, said columns having laterally offset vertical guide portions at their upper and lower ends and upwardly converging central portions, said bottom chord having spring pockets underlying the converging portions of the columns and a horizontally disposed seat between said spring pockets, a transom having an end portion mounted for vertical movement between the guide columns, said end portion having a horizontally disposed base portion overlying said seat and spring pockets and a narrower upper portion guided between the upper vertical end portions of the columns, said transom having shoulders overlying the inner sides of the upper portions of the guide columns and bottom flanges overlying the inner and outer faces of said bottom chord at opposite sides of said seat, said transom being movable vertically in said side frame opening a sufficient distance to position said bottom flanges clear of said seat to permit removal of the side frame, springs mounted in said pockets and yieldably supporting the transom, said springs having a range of movement such that the springs are freed from the transom when the transom is lifted to the position permitting removal of the side frame, said springs being compressible into said pockets to permit the transom to rest upon said seat upon the imposition of a predetermined load upon the springs, a spring plank pivotally suspended from the transom, a bolster guided for vertical sliding movement in the transom, and cushioning springs interposed between the spring plank and bolster.

11. In a car truck, a side frame having top and bottom chords and spaced guide columns connecting said chords, said columns having laterally offset vertical guide portions at their upper and lower ends and upwardly converging central portions, said bottom chord having spring pockets underlying the converging portions of the columns and a horizontally disposed seat between said spring pockets, a transom having an end portion mounted for vertical movement between the guide columns, said end portion having a horizontally disposed base portion overlying said seat and spring pockets and a narrower upper portion guided between the upper vertical end portions of the columns, said transom having shoulders overlying the inner sides of the upper portions of the guide columns and bottom flanges overlying the inner and outer faces of said bottom chord at opposite sides of said seat, said transom being movable vertically in said side frame opening a sufficient distance to position said bottom flanges clear of said seat to permit removal of the side frame, springs mounted in said pockets and yieldably supporting the transom, said springs having a range of movement such that the springs are freed from the transome when the transom is lifted to the position permitting removal of the side frame, said springs being compressible into said pockets to permit the transom to rest upon said seat upon the imposition of a predetermined load upon the springs, a spring plank pivotally suspended from the transom, a bolster guided for vertical sliding movement in the transom, and cushioning springs interposed between the spring plank and bolster, the bolster cushioning springs being less yieldable than said transom cushioning springs.

12. In a car truck, a side frame having top and bottom chords and spaced columns connecting said chords and forming a central opening, said bottom chord having two end pockets, one adjacent each column, a central pocket between the two first mentioned pockets and seats intermediate the end pockets, springs in said pockets which normally project above said seats, and a transom having an end portion guided for vertical movement in the side frame opening and having a base member resting upon said springs, said springs being compressible into the pockets in which they are mounted to permit said base member to engage said seats.

13. In a car truck, a side frame having top and bottom chords and spaced columns connecting said chords and forming a central opening, said bottom chord having two end pockets, one adjacent each column, a central pocket between the two first mentioned pockets and seats intermediate the end pockets, coil springs in the end pockets, a leaf spring in the central pocket, said springs normally projecting above said seats, and a transom having an end portion guided for vertical movement in the side frame opening and having a base member resting upon said springs, said springs being compressible into the pockets in which they are mounted to permit said base member to engage said seats.

14. In a car truck having side frames and superimposed sets of supporting and cushioning springs, one of said sets of springs having materially greater yieldability than the other set, the lower springs being supported upon the side frames, a supporting member interposed between the sets of cushioning springs, a car body supporting bolster supported in the region of its end portions upon the uppermost set of cushioning springs, and means for limiting the downward movement of the supporting member carried by the more yieldable set of cushioning springs to limit the deflection of the latter set of cushioning springs, said limiting means being so disposed as to provide a range of movement for said springs of greater yieldability sufficient to enable the latter springs to support the weight of a car loaded substantially to capacity and to cushion normal service shocks when the car is empty or lightly loaded, the upper springs of less yieldability, bearing the load at all times, whereby they serve to dampen vibrations for a lightly loaded car and to cushion a heavily loaded car.

15. In a car truck, side frames, a transom supported at its ends for vertical movement on the side frames, cushioning springs interposed between the side frames and transom, a bolster supported by the transom, cushioning springs interposed between the transom and bolster and supporting the end portions of the bolster and adapted to cushion maximum loads carried by the bolster, said springs having less yieldability than the transom cushioning springs, and means for limiting the downward movement of the transom with respect to the side frames to limit the deflection of the transom cushioning springs, said limiting means being positioned to permit the transom springs to have a deflection slightly beyond that caused by the weight of approximately the maximum static load, whereby said transom springs are adapted to cushion normal service shocks when the car is empty or lightly loaded, said cushioning springs of less yieldability, bearing the load at all times, whereby they serve to dampen vibrations for a lightly loaded car and to cushion a heavily loaded car.

16. In a car truck, side frames, a transom supported at its ends for vertical movement on the side frames, a set of supporting and cushioning springs interposed between the side frames and transom, a load carrying bolster supported by the transom, a set of supporting and cushioning springs interposed between the transom and bolster in the region of the end portions thereof, one of said sets of springs having materially greater yieldability than the springs of the other set, and means for limiting the deflection of the set of cushioning springs of greater yieldability to a predetermined maximum whereby relatively light loads are cushioned by both sets of springs and relatively heavy loads are cushioned by the stiffer set of springs, said limiting means being positioned to permit the springs of greater yieldability to have a range of movement sufficient to take the weight of approximately the maximum static load and to cushion normal service shocks when the car is empty or lightly loaded, said cushioning springs of less yieldability, bearing the load at all times, whereby they serve to dampen vibrations for a lightly loaded car and to cushion a heavily loaded car.

17. In a car truck, side frames having top and bottom chords and central openings between said chords, said bottom chord having a seating portion centrally of said opening and spring pockets on opposite sides of said seating portion, a transom having end portions guided for vertical movements in said central openings of the side frames, said end portions each having seating portions engageable with the seating portions of the lower chords, transom cushioning springs in said pockets for holding said transom clear of said bottom chord seats under static loads, a bolster supported by said transom, and cushioning springs interposed between the bolster and transom and adapted to cushion loads in excess of that which will cause the transom to seat on the bottom chords.

18. A car truck having supporting wheels, axles and side frame members connecting said axles, a car body supporting bolster extending across the space between the side frames, a set of springs carried by the side frames, a set of springs supporting the bolster in the region of the end portions thereof, a member supported upon the first mentioned springs and supporting the bolster supporting springs, one of said sets of springs having a high load supporting capacity and a relatively low deflection rate, the other set of springs having a relatively low load supporting capacity and having a deflection rate materially higher than the first, and means for limiting the relative movements of the members supported by and supporting the last-mentioned springs, said limiting means being arranged to limit the load imposed upon said springs to an amount as great as but not greatly in excess of the maximum static load for which the truck is designed, whereby said springs provide a spring cushion in which the deflection characteristics are automatically changed upon a predetermined increase in spring load, said spring cushion having a relatively high rate of deflection throughout a range of loads sufficient to cushion normal service shocks when the car is lightly loaded and a relatively low deflection rate for higher loads.

19. A car truck having side frames, a transom extending across the space between the side frames, transom supporting springs interposed between the transom and side frames, a bolster, bolster supporting springs interposed between the transom and bolster to support the bolster in the region of the end portions thereof, said bolster supporting springs having a high load supporting capacity and a relatively low deflection rate, the transom supportings springs having a relatively low load supporting capacity and having a deflection rate materially higher than the bolster springs, and stops on the side frames for limiting the downward movement of the transom, said stops being so positioned as to limit the load imposed upon the transom springs to an amount as great as but not greatly in excess of the maximum static load for which the truck is designed, whereby said springs provide a cushion for the bolster in which the deflection characteristics are automatically changed upon a predetermined increase in spring load, said spring cushion having a relatively high rate of deflection throughout a range of loads sufficient to cushion normal service shocks when the car is lightly loaded and a relatively low deflection rate for higher loads.

20. A car truck comprising supporting wheels, axles and side frame members connecting said axles, a bar body supporting bolster, a cushion for the bolster comprising a plurality of sets of supporting springs, said cushion being relatively soft and having a relatively high deflection rate under spring loads up to that imposed by the maximum static load for which the truck is designed, and means operable upon the imposition of a predetermined load approximating but not greatly in excess of the maximum static load to prevent one set of springs being subject to deflection by further imposed spring loadings and to thereby change the deflection characteristics of the spring cushion to provide a cushion having a substantially lower deflection rate for loads above the predetermined load, whereby a relatively soft cushion capable of cushioning normal service shocks is provided when the car is lightly loaded and a relatively stiff cushion is provided for higher loads to absorb shocks resulting from impacts, said bolster supporting springs supporting the bolster in the region of the ends thereof.

21. In a car truck, side frames having top and bottom chords and central openings between said chords, said bottom chord having a seating portion centrally of said opening and spring pockets on opposite sides of said seating portion, a transome having end portions guided for vertical movements in said central openings of the side frames, said end portions each having seating portions engageable with the seating portions of the lower chords, a cushioning pad carried by one of said seating portions, transom cushioning springs in said pockets, a bolster supported by said transom, and cushioning springs interposed between said transom and bolster.

22. In a car truck, the combination with the side frames thereof, having central openings and spring receiving pockets below the openings, of a transom having its ends mounted for vertical movements in said central openings and overlying said pockets, said transom and side frames having interengaging guide members at the sides and at the bottoms of said openings, and cushioning springs disposed in said pockets in the bottom portions of the side frames upon which the ends of the transom rest, said springs being compressible in said pockets to permit said transom to seat upon the bottoms of said openings when a predetermined weight substantially greater than that of the car body is imposed thereon.

23. In a car truck, side frames each having a substantially rectangular opening and spring receiving pockets at the bottom of said opening, a transom having substantially rectangular end portions guided for vertical movement in said frame openings, cushioning springs mounted in said pockets and having a substantial portion thereof within the pockets, the size and capacity of said cushioning springs being such that said springs are compressed into said pockets and permit the end portions of the transom to seat upon the bottoms of the transom openings when a predetermined load substantially greater than the weight of the car body is imposed upon the transom, and a bolster yieldably supported upon the transom.

24. In a car truck, side frames having top and bottom chords and central openings between said chords, said bottom chords each having a seating portion centrally of said opening and spring pockets on opposite sides of said seating portion, a transom having end portions guided for vertical movement in said side frame openings, each end portion having a seating portion overlying the seating portion of the bottom chord and spring receiving portions overlying said pockets, guide flanges carried by each end portion of said transom on opposite sides of the seating portion thereof and straddling the seating portion of the bottom chord, springs interposed between the transom and bolster, transom supporting springs mounted in said pockets, and an impact cushioning pad mounted on the seating portion of each bottom chord.

RUDOLPH LEPPLA.